US012728434B2

(12) United States Patent
Burmann et al.

(10) Patent No.: US 12,728,434 B2
(45) Date of Patent: Sep. 8, 2026

(54) VALVE SPRING, PUMP, DISPENSING UNIT AND DISPENSER

(71) Applicant: APTAR DORTMUND GMBH, Dortmund (DE)

(72) Inventors: Guido Burmann, Dortmund (DE); Börje Hegenberg, Dortmund (DE); Ralf Jordan, Dortmund (DE); Lukas Kurosky, Dortmund (DE)

(73) Assignee: APTAR DORTMUND GMBH, Dortmund (DE)

( * ) Notice: Subject to any disclaimer, the term of this patent is extended or adjusted under 35 U.S.C. 154(b) by 132 days.

(21) Appl. No.: 18/832,254

(22) PCT Filed: Jan. 23, 2023

(86) PCT No.: PCT/EP2023/051568
§ 371 (c)(1),
(2) Date: Jul. 23, 2024

(87) PCT Pub. No.: WO2023/139260
PCT Pub. Date: Jul. 27, 2023

(65) Prior Publication Data

US 2025/0161968 A1 May 22, 2025

(30) Foreign Application Priority Data

| | | |
|---|---|---|
| Jan. 24, 2022 | (EP) | 22152969 |
| Mar. 7, 2022 | (EP) | 22160513 |
| May 19, 2022 | (EP) | 22174425 |

(51) Int. Cl.
*B05B 11/10* (2023.01)

(52) U.S. Cl.
CPC ...... *B05B 11/1077* (2023.01); *B05B 11/1016* (2023.01)

(58) Field of Classification Search
CPC ............. B05B 11/1077; B05B 11/1016; B05B 11/1047; B05B 11/1067; B05B 11/0044; B05B 11/105; B05B 11/1074
See application file for complete search history.

(56) References Cited

U.S. PATENT DOCUMENTS

| | | | | |
|---|---|---|---|---|
| 4,597,511 A * | 7/1986 | Licari | F04B 53/1072 | 137/454.6 |
| 4,815,663 A * | 3/1989 | Tada | B05B 11/0032 | 267/71 |

(Continued)

FOREIGN PATENT DOCUMENTS

| | | |
|---|---|---|
| WO | WO 95/08400 A1 | 3/1995 |
| WO | WO 01/47641 A1 | 7/2001 |

(Continued)

OTHER PUBLICATIONS

International Preliminary Report on Patentability for International Application No. PCT/EP2023/051568, mailed Aug. 8, 2024.

(Continued)

*Primary Examiner* — Donnell A Long
(74) *Attorney, Agent, or Firm* — Jason H. Vick; Amped IP LLC

(57) ABSTRACT

A valve spring made of plastic, in particular for pretensioning a valve stem against a valve seat of a dispensing unit for dispensing a preferably liquid product, is proposed, wherein the valve spring has a plurality of spring elements arranged axially one behind the other, in particular along an axis or longitudinal axis. According to a first aspect, each spring element has two curved portions which are formed mirror-symmetrically with respect to one another and are connected to one another at their ends. According to a further aspect, the valve spring has a leaf-spring-like or cup-spring-like construction.

16 Claims, 6 Drawing Sheets

(56) References Cited

U.S. PATENT DOCUMENTS

| | | | | |
|---|---|---|---|---|
| 4,989,790 | A * | 2/1991 | Martin | B05B 1/3452 239/483 |
| 5,046,645 | A | 9/1991 | Hagan et al. | |
| 5,388,766 | A | 2/1995 | Buisson | |
| RE35,744 | E * | 3/1998 | Foster | B05B 11/0064 239/481 |
| 6,669,061 | B2 * | 12/2003 | Tada | B05B 11/0032 222/153.13 |
| 2007/0210117 | A1 * | 9/2007 | Foster | B05B 11/1064 222/340 |
| 2014/0182183 | A1 | 7/2014 | Cauley et al. | |
| 2014/0183283 | A1 | 7/2014 | Tada | |
| 2018/0281004 | A1 | 10/2018 | Nilsson et al. | |
| 2019/0344297 | A1 | 11/2019 | Barenhoff et al. | |
| 2021/0001361 | A1 | 1/2021 | Burmann et al. | |

FOREIGN PATENT DOCUMENTS

| | | | |
|---|---|---|---|
| WO | WO 2018/108535 | A1 | 6/2018 |
| WO | WO 2019/175349 | A1 | 9/2019 |
| WO | WO 2022/243475 | A1 | 11/2022 |

OTHER PUBLICATIONS

International Search Report for International Application No. PCT/EP2023/051568, mailed Mar. 24, 2023.

Written Opinion for International Application No. PCT/EP2023/051568, mailed Mar. 24, 2023.

* cited by examiner

VALVE SPRING, PUMP, DISPENSING UNIT AND DISPENSER

CROSS-REFERENCE TO RELATED APPLICATIONS

This application is a national stage application under 35 U.S.C. 371 of PCT Application No. PCT/EP2023/051568 having an international filing date of 23 Jan. 2023, which designated the United States, which PCT application claimed the bene-fit of European Patent Application No. 22152969.6 filed 24 Jan. 2022, European patent application Ser. No. 22160513.2, filed 7 Mar. 2022, and European Patent Application No. 22174425.3 filed 19 May 2022, each of which are incorporated herein by reference in their entirety.

BACKGROUND

The present invention relates to a valve spring made of plastic, a pump for dispensing a preferably liquid product, a dispensing unit for dispensing a preferably liquid product and a dispensing device for dispensing a preferably liquid product.

In the present invention, the term "dispensing device" is preferably understood to mean a device for the in particular spraying discharge or dispensing of a preferably liquid product, particularly preferably as an aerosol.

Preferably, a dispensing device in the sense of the present invention comprises a container as a reservoir with or for a product, a pump for conveying the product and a dispensing head for the in particular spraying dispensing of the product to a user. Preferably, a dispensing device in the sense of the present invention is manually operable and/or has a manually operable pump.

In the present invention, the term "dispensing unit" is preferably understood to mean a preferably multi-part assembly which is connectable to a container. Preferably, the dispensing unit is screwable onto the container. The dispensing unit preferably has the dispensing head and the pump. Preferably, a dispensing device is formed by the container and the dispensing unit.

In the present invention, the term "pump" is preferably understood to mean a constructive device which is designed for conveying a product, in particular a fluid or a liquid. In particular, a product can be sucked from a container, pressurized and/or dispensed, for example as an aerosol, by means of a pump. Preferably, a pump in the sense of the present invention is designed as an in particular manually operable positive displacement pump, in particular metering pump, particularly preferably reciprocating piston pump, in particular wherein a defined volume of the product is conveyed or can be conveyed by (manual) actuation of the pump, in particular per stroke.

Preferably, a pump in the sense of the present invention has a piston, a pump chamber, an inlet and an outlet, preferably wherein the inlet and the outlet can each be opened or closed by an associated valve. In particular, a defined volume of a product can be conveyed or sucked into the pump chamber by a stroke movement of the piston, pressurized in the pump chamber and dispensed from the pump chamber via the inlet.

In the sense of the present invention, the term "product" is understood to mean in particular fluids, such as liquids, suspensions or the like. A product in the sense of the present invention can be dispensed, for example, as a paste, spray, jet or mist or aerosol or in another way, for example as a foam or gel.

WO 2018/108535 A1 discloses a dispensing device of the type mentioned at the outset with a pump of the type mentioned at the outset. The pump has a spring sleeve which separates a spring, by means of which the piston is pretensioned into an initial position, from the product. In the illustrative embodiment, the spring is designed as a helical spring and is produced from metal. The spring sleeve prevents the spring from corroding or rusting and thus impairing the product quality and prevents the spring from forming a flow resistance for the product.

WO 01/47641 A1 discloses a dispensing unit with a dispensing head and a pump of the type mentioned at the outset. The dispensing head and the piston of the pump are pretensioned or can be returned into an initial position by an elastic means, in particular a compression spring. The compression spring consists of plastic and surrounds the piston, so that it does not come into contact with the liquid. Furthermore, the pump has an outlet valve with a valve spring, a shaft and a valve seat, wherein the piston of the pump forms the valve seat. The shaft is pretensioned into a closed position by a separate elastic means made of a non-metallic elastic material, or thermoplastic rubber.

WO 95/08400 A1 discloses a dispensing unit with a dispensing head and a pump of the type mentioned at the outset. A return spring for pretensioning or returning the dispensing head and the piston into an initial position is arranged within the pump chamber and is bathed there by the product. The outlet valve of the pump has a valve spring, a shaft and a valve seat, wherein the valve seat is formed by the piston. The shaft is pretensioned by a separate helical spring against the valve seat into a closed position.

WO 2019/175349 A1 discloses a dispensing device for dispensing a fluid with a pump device for conveying the fluid from a container. The pump device is operable by means of an actuation lever of the dispensing device and has a flexible bellows for conveying the fluid. A conduit, which forms a supply channel for the fluid to the bellows, is seated sealingly in a guide. The conduit has a taper on the outside, so that it is lifted from the guide upon actuation of the dispensing device and in this way a ventilation gap for ventilating the container is formed between the guide and the conduit. The ventilation gap thus arises directly upon movement of the conduit.

SUMMARY

The object of the invention is to provide an improved valve spring or pump and/or an improved outlet valve of the pump, which is simpler and/or cheaper to produce, and/or to enable improved recycling of a valve spring or pump or dispensing unit or dispensing device.

The above object is solved by a valve spring, a pump, a dispensing unit, or a dispensing device as disclosed herein.

A valve spring according to the proposal consists of plastic and is designed in particular for pretensioning a valve stem against a valve seat of a dispensing unit for dispensing a preferably liquid product. The valve spring has a plurality of spring elements arranged axially one behind the other, in particular along an axis or longitudinal axis.

In particular, in the valve spring according to the proposal, each spring element has two curved portions which are formed mirror-symmetrically with respect to one another and are connected to one another at their ends. Alternatively or additionally, the valve spring according to the proposal has a leaf-spring-like or cup-spring-like construction.

A pump according to the proposal preferably has a pump housing, a piston, a pump chamber, an inlet, an outlet, an inlet valve and/or an outlet valve.

The piston is axially movable in order to convey the product via the inlet into the pump chamber and out of the pump chamber to the outlet.

According to one aspect of the present disclosure, the piston is guided in a guide, in particular of the pump housing. In this case, the piston preferably has a first portion and a second portion, wherein, in an initial position of the piston, the first portion bears radially sealingly against the guide and the second portion is at least partially spaced apart from the guide. Furthermore, the pump is preferably designed such that, upon movement of the piston out of the initial position up to a specific stroke, the radial sealing of the piston with respect to the guide is maintained and (only) upon exceeding the specific stroke, a ventilation gap is formed between the piston, in particular the second portion, and the guide.

The ventilation gap makes it possible, in particular, for air to pass between the piston and the guide and thus, in particular, to pass into a container assigned to the pump. As a result, the occurrence of a negative pressure in the container during the conveying of product from the container by means of the pump is prevented. As a result of the mentioned design of the piston and the guide, improved sealing between the piston and the guide or improved sealing of an associated container is achieved. In particular, it is achieved that reliable sealing still takes place even when a return device for pretensioning or returning the piston into the initial position, for example as a result of wear and/or aging, is no longer able to move the piston completely into the initial position.

According to a further aspect, which can also be realized independently, the outlet valve of the pump according to the proposal has a valve spring, a valve seat and a valve body or shaft, wherein the shaft is pretensioned by means of the valve spring against the valve seat into a closed position, and wherein the valve spring and the shaft are formed in one piece or are formed by different portions of a one-piece component. In particular, the valve spring and the shaft consist of the same material.

The one-piece design facilitates the assembly of the pump, since the number of components to be joined is reduced in comparison with a pump in which the valve spring and the shaft are formed by different components. Furthermore, the complexity in the production of the valve spring and the shaft as well as recycling are facilitated.

The specific stroke is preferably at least 2 mm or more, particularly preferably at least 3 mm or more, and/or at most 6 mm or less, more preferably at most 5 mm or less, particularly preferably at most 4 mm or less. As a result, reliable sealing is made possible even when the piston is not completely returned into the initial position.

It is preferred that the second portion of the piston is at least partially conical and/or that the first portion has a first diameter and the second portion has a second diameter which is smaller than the first diameter. In this way, it is particularly easy to realize that the radial sealing of the piston with respect to the guide is maintained up to a specific stroke and the ventilation gap is formed only upon exceeding the specific stroke.

The guide preferably has a circumferential sealing lip which, in the initial position, bears radially sealingly against the piston, in particular the first portion of the piston. The sealing lip is preferably formed in one piece with the guide and/or by a projection of the guide or the like.

The component whose different portions form the valve spring and the valve body or shaft preferably consists of plastic and/or is preferably an injection-molded part. As a result, simple and/or inexpensive production of the pump or the component is made possible.

The component or the valve spring and the shaft are preferably arranged at least partially in a housing. The housing is preferably in turn fastened or arranged on the piston and/or is arranged within the pump chamber and/or the pump housing and/or is preferably axially movable within the pump chamber and/or the pump housing. The housing is preferably fastened on the piston, so that it moves together with the piston upon an axial movement of the piston.

The valve spring is preferably separated from the product and/or the valve spring does not come into contact with the product. It is preferred that the housing is arranged between the valve spring and the product and/or the valve spring is separated from the product by the housing. The separation of the product from the spring is conducive to a longer durability of the spring and/or the pump overall, since in particular chemical reactions and/or swelling can be avoided. Furthermore, impairments of the product quality due to contact with the spring can be prevented as a result. Furthermore, the dispensing of the product and/or the spray pattern is improved, since a flow around the spring by the product is avoided and thus fewer turbulences arise.

The component preferably has a separating section which separates the valve spring from the product. The separating section is preferably formed in one piece with the valve spring and the shaft and/or is arranged between the valve spring and the shaft. The valve spring is particularly preferably separated from the product by the housing on the one hand and the separating section of the component on the other hand. In other words, a sealed spring chamber for the valve spring is preferably formed by the housing and the separating section, wherein the valve spring is arranged in the spring chamber.

The pump preferably has a pre-compression mechanism and/or a pre-compression mechanism is formed by the piston, the shaft, the valve spring and the housing. As a result, improved dispensing of the product is achieved and in particular dripping is prevented. Furthermore, particularly fine atomization during dispensing of the product as a spray or aerosol is made possible or achieved by the pre-compression mechanism.

The inlet valve and/or the outlet valve is/are preferably designed as a self-opening valve.

It is preferred that the piston has or forms the valve seat of the outlet valve. This is conducive to a simple design.

Preferably, the piston, the pump chamber, the valve spring, the inlet valve and/or the outlet valve are arranged at least partially in the pump housing.

According to a further aspect, which can also be realized independently, the present invention relates to a dispensing unit for dispensing a preferably liquid product. The dispensing unit has in particular a pump designed as described above and/or below. Furthermore, the dispensing unit according to the proposal has a dispensing head connected to the piston of the pump, via which a product conveyed by the pump can be dispensed. In particular, the pump is thus fluidically connected to the dispensing head in such a way that a product conveyed by the pump can be dispensed via the dispensing head.

The dispensing unit preferably has a return device, in particular a return spring, for pretensioning and/or returning the piston and/or the dispensing head into the initial position.

It is preferred that the return device is designed as a spring bellows and/or consists of plastic.

Preferably, the return device is arranged between the dispensing head and the pump and/or the return device or the spring bellows at least partially surrounds the pump and/or the piston. In particular, the return device is arranged outside the pump and/or the pump chamber. As a result, in particular contact of the return device with the product is prevented and/or the return device is separated from the product and corresponding advantages are achieved, in particular chemical reactions and/or swelling are avoided.

According to a further aspect, which can also be realized independently, the present invention relates to a dispensing device for dispensing a preferably liquid product, wherein the dispensing device has a dispensing unit as described above and/or below and a container with or for the product. In the case of the dispensing device, the dispensing head of the dispensing unit is fluidically connected to the container via the pump, so that the product can be conveyed from the container with the pump and can be dispensed via the dispensing head.

The aforementioned and following aspects and features of the present invention can be combined with one another as desired, but can also each be realized independently of one another.

Further aspects, features, advantages and properties of the present invention result from the claims and the following description of a preferred embodiment with reference to the drawing.

DETAILED DESCRIPTION

In the figures, the same reference signs are used for identical or similar components and devices, wherein the same or corresponding advantages and properties can result, even if a repeated description is omitted.

Figure 1:
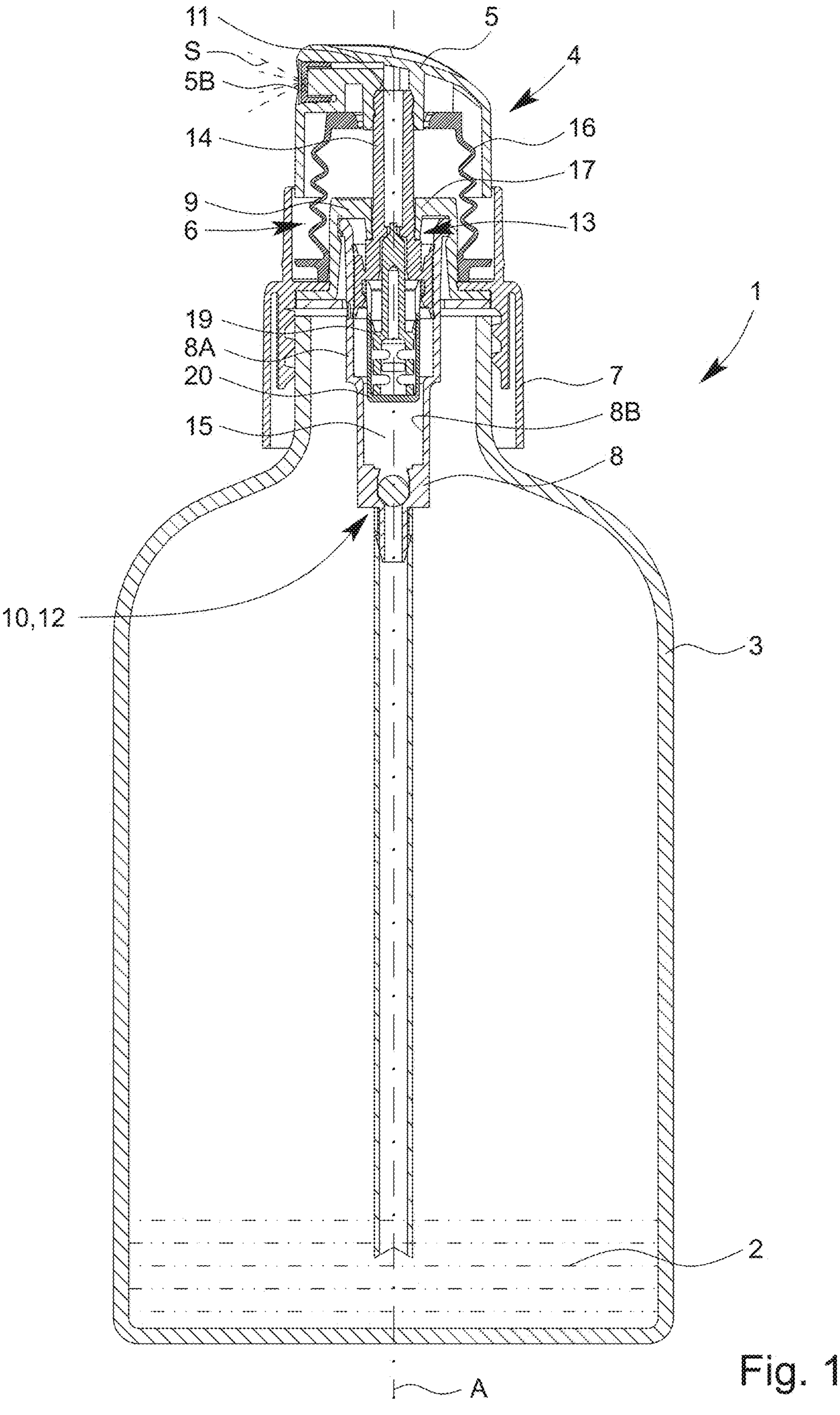
FIG. 1 shows a sectional representation of a dispensing device according to the proposal.

FIG. 1 shows a schematic section of a dispensing device 1 according to the proposal for dispensing a product 2. In the state shown, the dispensing device 1 is not actuated and/or the dispensing device 1 is in an initial or rest position.

The product 2 is preferably a fluid, in particular a liquid.

The dispensing device 1 preferably has a container 3 with or for the product 2.

Preferably, the container 3 is designed as a reservoir for the product 2. Particularly preferably, the dispensing device 1 or container 3 comprises a volume of more than 5 ml or 10 ml, in particular more than 50 ml or 100 ml, and/or less than 1000 ml or 13B0 ml, in particular less than 600 ml or 500 ml.

The container 3 is preferably elongated, cylindrical and/or rigid. Particularly preferably, the container 3 is produced from metal, plastic or glass.

Furthermore, the dispensing device 1 preferably has a dispensing unit 4 for dispensing the product 2 to a not-shown user.

Preferably, the dispensing unit 4 is connected or connectable—in particular mechanically and/or fluidically—to the container 3. The dispensing unit 4 is preferably screwable onto the container 3.

The dispensing device 1 and/or the dispensing unit 4 preferably has a dispensing head 5 for dispensing the product 2 to a not-shown user.

Preferably, the dispensing unit 4 and/or the dispensing head 5 has a nozzle 5B for the spraying dispensing of the product 2 or a dispensing of the product 2 as an aerosol or spray S.

The dispensing device 1 and/or dispensing unit 4 preferably has a pump 6, in particular of the type mentioned at the outset. Particularly preferably, the pump 6 is designed as a positive displacement pump, in particular metering pump or reciprocating piston pump.

Figure 2:
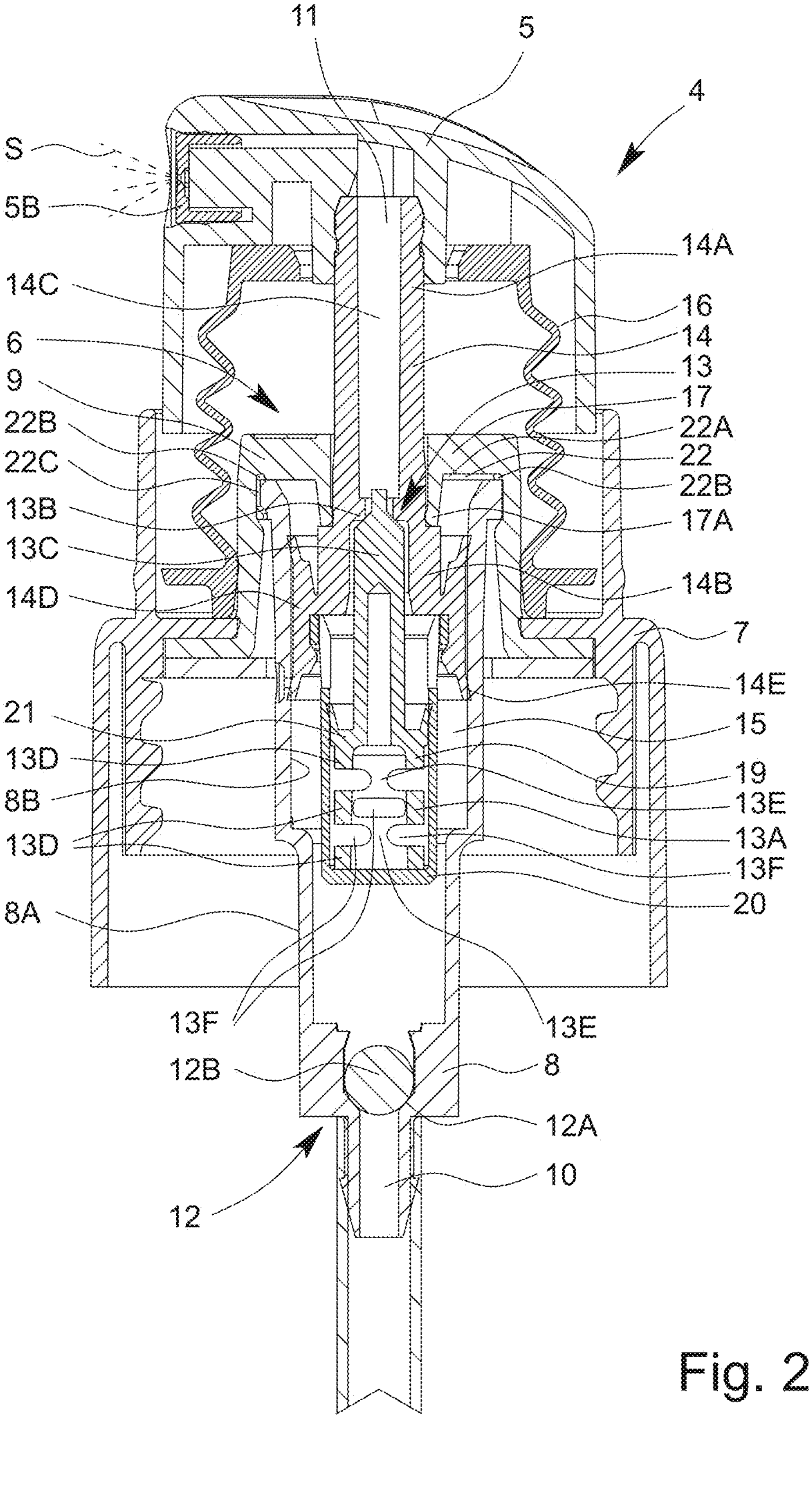
FIG. 2 shows a sectional representation of a dispensing unit according to the proposal with a pump according to the proposal in an initial position.
Figure 3:
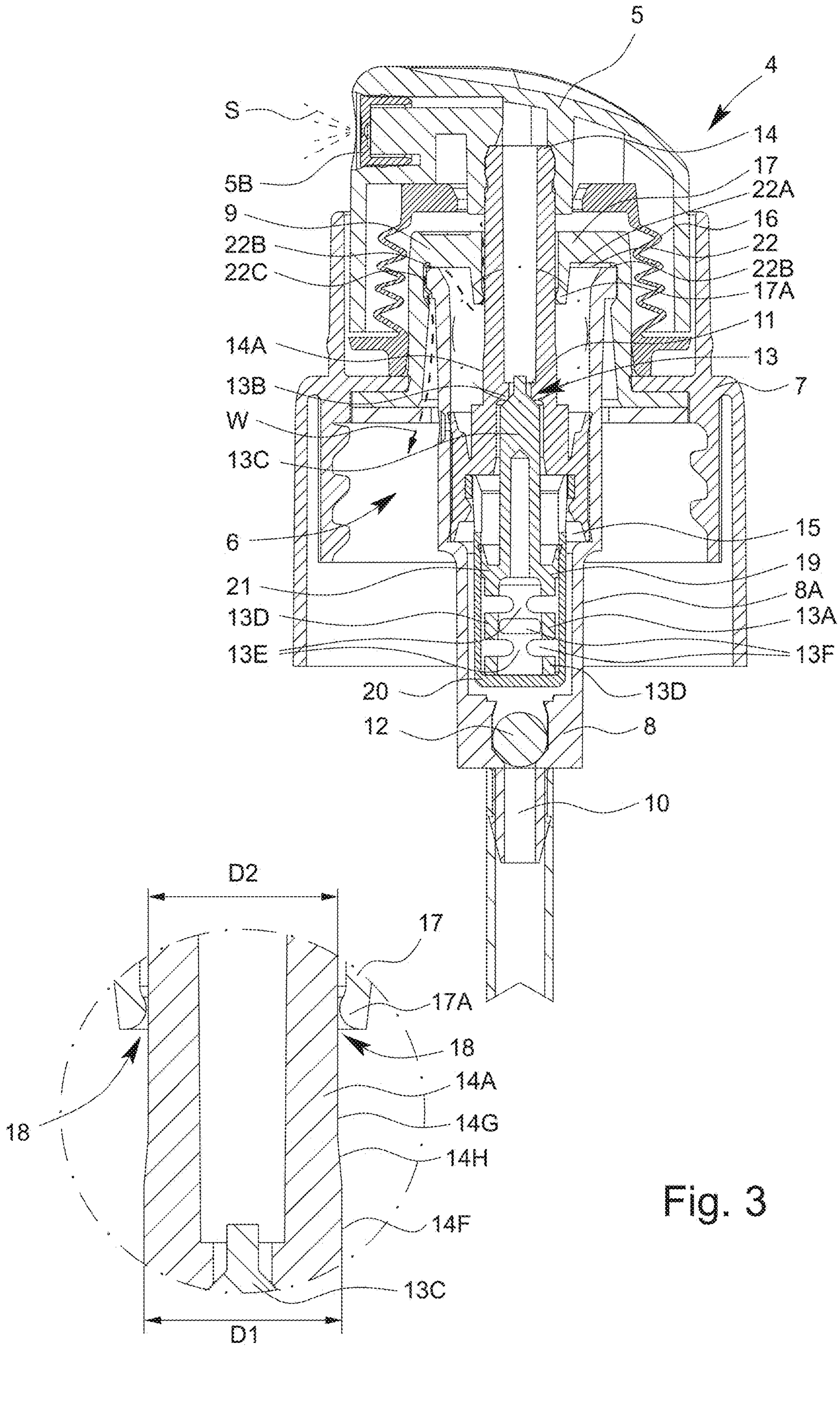
FIG. 3 shows a sectional representation of a dispensing unit according to the proposal with a pump according to the proposal in an end position.

FIGS. 2 and 3 each show a schematic section of the dispensing unit 4 with the pump 6 in different states or positions. In FIG. 2, the pump 6 is shown in the initial position and in FIG. 3, the pump 6 is shown in an end position.

The pump 6 is preferably designed to suck or convey, pressurize and/or dispense the product 2, in particular a predefined volume of the product 2, from the container 3.

Particularly preferably, the dispensing head 5 is fluidically connected or connectable to the container 3 via the pump 6.

The pump 6 is preferably arranged at least partially in the interior of the container 3. In particular, the pump 6 extends from the dispensing head 5 into the container 3.

The dispensing head 5 is preferably mechanically and/or fluidically connected or connectable to the pump 6. In particular, the pump 6 is connected or connectable to the container 3 and/or dispensing head 5 in a form-fitting, force-fitting and/or integrally bonded manner.

In the embodiment shown, the dispensing unit 4 has a connecting part 7. The connecting part 7 is preferably connectable to the container 3 or fastenable to the container 3, in particular by means of a screw connection or by screwing on. The dispensing unit 4 and/or pump 6 is preferably connectable to the container 3 or fastenable to the container 3 by means of the connecting part 7.

The pump 6 preferably has a pump housing 8, a housing lid 9, an inlet 10, an outlet 11, an inlet valve 12, an outlet valve 13, a piston 14 and/or a pump chamber 15.

Preferably, the pump housing 8, the housing lid 9, the inlet 10, the outlet 11, the inlet valve 12, the outlet valve 13 and/or the piston 14, particularly preferably all components of the pump 6, is/are produced from plastic and/or injection-molded.

The pump 6, in particular the pump housing 8, is preferably elongated and/or rotationally symmetrical. In particular, the pump 6 and/or the pump housing 8 has a longitudinal axis A, preferably wherein the longitudinal axis A is an axis of rotation of the pump 6 and/or of the pump housing 8.

Indications such as "axial" and "radial" relate in particular to the longitudinal axis A. Accordingly, for example, an axial direction is a direction which runs along the longitudinal axis A or parallel to the longitudinal axis A and a radial direction is a direction which runs radially to the longitudinal axis A.

The pump housing 8 is preferably designed as an in particular elongated hollow cylinder.

The pump housing 8 preferably has an at least substantially cylindrical and/or sleeve-like lower part 8A and the housing lid 9 or is formed thereby.

Preferably, the housing lid 9 closes the pump housing 8 at least substantially, particularly preferably axially.

The housing lid 9 and the pump housing 8 are preferably connected to one another in a form-fitting, force-fitting and/or integrally bonded manner. In the embodiment shown, the housing lid 9 is plugged and/or latched onto the pump housing 8 and/or is designed as a cap.

Preferably, the pump 6 can be flowed through axially or along the longitudinal axis A and/or from the inlet 10 to the outlet 11.

Preferably, the inlet 10 is arranged at a first, in the customary position of use of the dispensing device 1 lower end of the pump 6 and the outlet 11 is arranged at a second, in the customary position of use of the dispensing device 1 upper end of the pump 6.

The customary position of use of the dispensing device 1 is shown in FIG. 1.

Preferably, the inlet 10 and the outlet 11 form the axial ends of the pump 6, in particular wherein the inlet 10 is assigned to the container 3 and the outlet 11 is assigned to the dispensing head 5.

Preferably, the product 2 or a predefined volume of the product 2 can be supplied via the inlet 10 to the pump chamber 15 and/or can be supplied from the pump chamber 15 via the outlet 11 to the dispensing head 5.

The inlet valve 12 is preferably assigned to the inlet 10 and/or arranged between the inlet 10 and the pump chamber 15. Preferably, the outlet valve 13 is assigned to the outlet 11 and/or arranged between the outlet 11 and the pump chamber 15.

Preferably, the inlet valve 12 has a valve seat 12A and a valve body 12B, preferably wherein the valve body 12B is movable relative to the valve seat 12A, in particular in order to open or close the inlet valve 12.

In the embodiment shown, the valve seat 12A is preferably formed by the pump housing 8, in particular the lower part 8A, or the pump housing 8 and/or the lower part 8A has the valve seat. Furthermore, in the embodiment shown, the valve body 12B is formed by a ball or sphere. However, other embodiments for the inlet valve 12 and/or for the valve seat 12A and the valve body 12B are also possible.

Preferably, the valve body 12B can be lifted from the valve seat 12A, in particular in the event of an enlargement of the pump chamber 15 and/or a pressure reduction in the pump chamber 15, in particular in such a way that the inlet valve 12 opens.

Preferably, the valve body 12B can be lowered onto the valve seat 12A, in particular in the event of a size reduction of the pump chamber 15 and/or a pressure increase in the pump chamber 15, particularly preferably in such a way that the inlet valve 12 closes.

Preferably, the flow through the pump 6 can be controlled by means of the inlet valve 12 and/or the outlet valve 13.

Preferably, the inlet valve 12 is designed to selectively make possible or prevent a flow of the product 2 from the container 3 into the pump chamber 15, in particular as a function of the pressure in the pump chamber 15.

Preferably, the outlet valve 13 is designed to selectively make possible or prevent a flow of the product 2 from the pump chamber 15 to the outlet 11, in particular as a function of the pressure in the pump chamber 15, 15.

Particularly preferably, the inlet valve 12 and/or the outlet valve 13 is/are (each) designed as an automatically opening or automatically closing valve, preferably wherein the inlet valve 12 and/or the outlet valve 13 opens or closes as a function of the pressure in the pump chamber 15.

Preferably, the pressure in the pump chamber 15 and/or the volume of the pump chamber 15 can be changed by actuation of the dispensing device 1 or pump 6 and/or by a stroke movement of the piston 14.

Particularly preferably, the volume of the pump chamber 15 can be reduced by actuation of the dispensing device 1 or a downward movement of the piston 14 and/or in the direction of the container 3 and/or the pressure in the pump chamber 15 can be increased by actuation of the dispensing device 1 or a downward movement of the piston 14 and/or in the direction of the container 3.

Particularly preferably, the outlet valve 13 opens (automatically) when a specific pressure in the pump chamber 15 and/or a size reduction of the pump chamber 15 is exceeded by means of the piston 14 and/or the outlet valve 13 closes (automatically) when a specific pressure in the pump chamber 15 and/or an enlargement of the pump chamber 15 is undershot by means of the piston 14.

Particularly preferably, the inlet valve 12 opens when a specific pressure in the pump chamber 15 and/or an enlargement of the pump chamber 15 by means of the piston 14 is undershot and/or the inlet valve 12 closes (automatically) when a specific pressure in the pump chamber 15 and/or a size reduction of the pump chamber 15 by means of the piston 14 is exceeded.

The valves 12, 13 can consequently be opened or closed—in particular automatically—as a function of the movement of the piston 14, preferably wherein the outlet valve 13 and the inlet valve 12 can be opened or closed contrary to one another and/or can be actuated by the movement of the piston 14.

Preferably, the inlet valve 12, the outlet valve 13, the piston 14 and/or the pump chamber 15 are arranged at least partially in the pump housing 8 and/or encased by the pump housing 8.

The piston 14 is preferably elongated and/or preferably has an in particular elongated piston shank 14A and/or a piston head 14B—in particular enlarged in comparison with the piston shank 14A.

Preferably, the piston 14, in particular the piston shank 14A, has the outlet 11 or forms the latter. In particular, the piston 14 or piston shank 14A has an (axial) outlet channel 14C, preferably wherein the outlet channel 14C opens into the outlet 11.

As already explained at the outset, the dispensing head 5 is preferably connected or connectable to the pump 6 in a form-fitting, force-fitting and/or integrally bonded manner. In the embodiment shown, the dispensing head 5 is plugged onto the pump 6, in particular the piston 14 or the piston shank 14A. However, other solutions are also possible here.

The piston 14 is preferably movable axially or along the longitudinal axis A, in particular in order to suck the product 2 from the container 3 or to enlarge the pump chamber 15, to pressurize the sucked-in product 2 in the pump chamber 15 and/or to reduce the size of the pump chamber 15 and to dispense it via the outlet channel 14C or the outlet 11, in particular on or via the dispensing head 5.

Preferably, the piston 14 is designed to execute a stroke movement in or relative to the pump housing 8. In particular, the piston 14 is movable downward or in the direction of the container 3 or inlet 10 by actuation or depression of the dispensing head 5, in particular in order to reduce the size of the pump chamber 15 and/or to pressurize the product 2 in the pump chamber 15.

Preferably, the piston head 14B has a larger diameter than the piston shank 14A and/or the piston 14 is guided laterally or radially via the piston head 14B in the pump housing 8.

Preferably, the piston 14 and/or the piston head 14B has an in particular circumferential guide surface 14D, preferably wherein the guide surface 14D is in contact with an inner surface 8B of the pump housing 8 or lower part 8A and/or is movable in a sliding manner over the inner surface 8B of the pump housing 8 or lower part 8A.

Preferably, the piston 14 and/or the piston head 14B has an in particular circumferential seal 14E, preferably wherein the seal 14E is in contact with the inner surface 8E of the pump housing 8, in particular in such a way that the pump chamber 15 is sealed outward and/or axially and/or upward.

In the embodiment shown, the seal 14E is preferably formed in one piece with the piston 14 and/or the piston 14, in particular the piston head 14B, forms the seal 14E. However, other solutions are also possible here, in particular in which the seal 14E is formed as a piston ring and/or is inserted into a circumferential groove on the piston head 14B.

The dispensing device 1 and/or dispensing unit 4 preferably has a return device 16 for pretensioning and/or returning the piston 14 into the initial position.

The dispensing device 1 and/or dispensing unit 4 and/or pump 6 preferably has an initial position and/or an end position. The pump 6 and/or the piston 14 is/are preferably movable between the initial position and the end position.

The initial position is the position shown in FIGS. 1 and 2 and the end position is the position shown in FIG. 3.

The piston 14 is preferably pretensioned into the initial position by means of the return device 16. Preferably, the return device 16 is designed for pretensioning and/or returning the piston 14 into the initial position, in particular after actuation of the dispensing unit 4 and/or pump 6, in particular by pressing down the dispensing head 5.

Pressing down the dispensing head 5 is understood in particular to mean pressing or moving the dispensing head 5 in the direction of the pump 6 and/or the container 3. In FIG. 3, the dispensing head 5 has been pressed down or actuated and the piston 14 and/or the pump 6 has been moved into the end position.

The return device 16 is preferably arranged outside the pump 6, the pump housing 8 and/or the pump chamber 15. Preferably, the return device 16 at least partially surrounds the pump 6, in particular the piston 14. The return device 16 preferably extends in the axial direction or axially to the longitudinal axis A.

The return device 16 is preferably arranged between the pump 6 and the dispensing head 5. In particular, the return device 16 is arranged between the housing lid 9 and/or the connecting part 7 on the one hand and the dispensing head 5 on the other hand and/or is arranged in such a way that a compression of the return device 16 takes place by actuating or pressing down the dispensing head 5.

The return device 16 is preferably designed as a spring or spring-like. In the illustrative embodiment, the return device 16 or spring is formed in particular by a bellows or spring bellows.

The return device 16 or the spring bellows preferably consists of plastic and/or an elastic material.

The return device 16 or the spring bellows preferably has a corrugated wall, in particular so that upon actuation of the dispensing unit 4 and/or the dispensing head 5, the wall is compressed and after actuation or when the dispensing head 5 is released, the dispensing head 5 and/or the piston 14 is driven back into the initial position by the return force of the compressed spring bellows.

However, it is not mandatory that the return device 16 is designed as a spring bellows. In principle, the return device 16 can also be formed by a helical spring or the like.

The piston 14, in particular piston shank 14A, of the pump 6 is preferably guided in a guide 17. It is preferred that the pump 6, particularly preferably the housing lid 9, has or forms the guide 17. Preferably, the guide 17 is formed by a preferably axial and/or central opening of the housing lid 9. However, other solutions are also possible here, for example a guide 17 separate from the housing lid 9.

Preferably, the piston 14, in particular the piston shank 14A, projects out of the pump housing 8 or the housing lid 9. The piston shank 14A preferably extends through the guide 17 or opening of the housing lid 9, in particular as far as the dispensing head 5.

The guide 17 is preferably cylindrical and/or arranged coaxially with the longitudinal axis A and/or centrally in the pump 6 or the housing lid 9.

The piston 14 preferably has a first portion 14F and a second portion 14G.

In the initial position of the piston 14, as shown in particular in FIGS. 1 and 2, the piston 14 or the first portion 14F preferably bears radially sealingly against the guide 17. In particular, in the initial position, no air can pass between the piston 14 and the guide 17.

Furthermore, in the initial position, the second portion 14G is at least partially spaced apart from the guide 17.

"Partially spaced apart" means in this connection in particular that a distance or free space is formed between the second portion 14G and the guide 17 at least at one point. In this case, it is also possible for the second portion 14G to bear predominantly against the guide 17 and for the distance or free space between the second portion 14G and the guide 17 to be formed, for example, by a gap or a depression on the outer side of the second portion 14B.

Upon movement of the piston 14 out of the initial position, a ventilation gap 18 is preferably formed between the guide 17 and the piston 14. Air can preferably pass through the ventilation gap 18, in particular for ventilating a container 3 fastened to the pump 6 or the dispensing unit 4 or for ventilating the container 3 in the dispensing device 1. The ventilation gap 18 is shown in particular in the enlargement in FIG. 3.

In particular, the ventilation gap 18 is not formed directly upon movement of the piston 14 out of the initial position or upon actuation of the dispensing unit 4 or the dispensing head 5, but rather only later and/or after an initial movement and/or only upon exceeding the specific stroke H. Thus, in the case of small movements of the piston 14 out of the initial position, sealing is ensured such that no product 2 can inadvertently pass between the piston 14 and the guide 17 or emerge from the container 3.

The pump 6 is preferably designed such that the piston 14 and the guide 17 are matched to one another such that, upon movement of the piston 14 out of the initial position up to a specific stroke H, the radial sealing of the piston 14 with respect to the guide 17 is maintained. Preferably, (only) upon exceeding the specific stroke H, a ventilation gap 18 is formed between the piston 14, in particular the second portion 14G, and the guide 17.

Preferably, the first portion 14F is moved out of the guide 17 upon exceeding the specific stroke H.

Figure 4A:
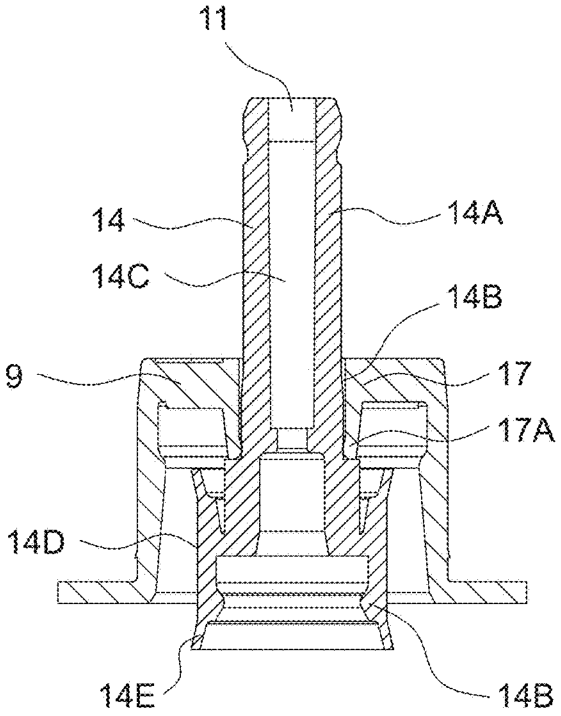
FIG. 4A shows a piston of the pump and a guide for the piston in the initial position.
Figure 4B:
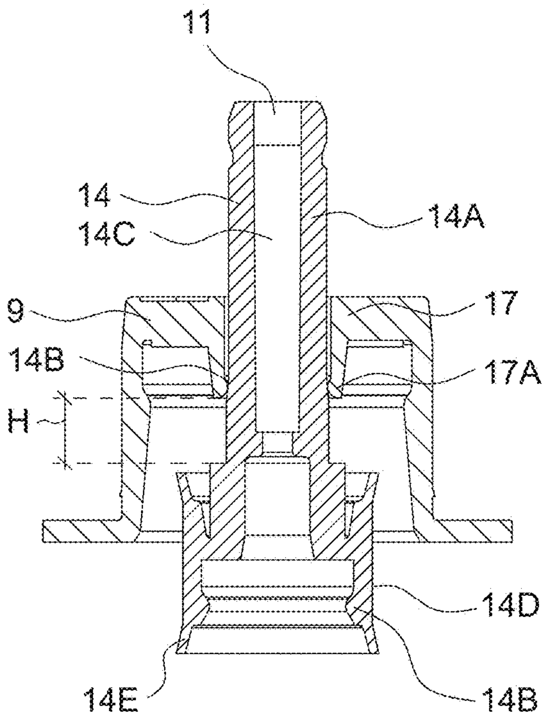
FIG. 4B shows the piston and the guide from FIG. 4A, wherein the piston has been moved out of the initial position by a specific stroke.

This is shown in particular in FIGS. 4A and 4B, which for the sake of clarity show only the piston 14 and the housing lid 9 or the guide 17:

In FIG. 4A, the piston 14 is in the initial position. In FIG. 4B, the piston 14 has been actuated or moved out of the initial position by the stroke H.

In the position shown in FIG. 4B, the guide 17 or its circumferential sealing lip 17A just still bears against the piston 14 or first portion 14F, so that the ventilation gap 18 is not yet formed. Upon further movement of the piston 14 out of the initial position, the ventilation gap 18 is then formed between the guide 17 and the piston 14.

The ventilation gap 18 is formed in particular by the second portion 14G being at least partially spaced apart from the guide 17 and thus, upon exceeding the specific stroke H, the first portion 14F being moved out of the guide 17 such that the ventilation gap 18 is formed by the distance or free space between the second portion 14G and the guide 17.

Preferably, the first portion 14F has a first diameter D1 and the second portion 14G has a second diameter D2. The second diameter D2 is preferably smaller than the first diameter D1. This is shown in particular in the enlargement of FIG. 3.

In particular, as a result of the different diameters D1, D2 of the first and second portions 14F, 14G, it is achieved that the piston 14 or first portion 14F is sealed or bears sealingly against the guide 17 in the initial position and, upon exceeding the specific stroke H, the ventilation gap 18 is formed.

The ventilation gap 18 is preferably annular.

The first portion 14F is preferably cylindrical at least in portions.

In the illustrative embodiment, the second portion 14G is at least partially conical and/or the second portion 14G has an in particular conical tapering 14H. In particular, the piston 14 or piston shank 14A in the illustrative embodiment therefore has a first portion 14F and a second portion 14G, wherein the diameter D1 of the first portion 14F is larger than the diameter D2 of the second portion 14G, and wherein the first portion 14F is connected to a cylindrical portion of the second portion 14G via the conical tapering 14H of the second portion 14G. In other words, the conical tapering 14H is preferably arranged between two cylindrical portions or the conical tapering 14H connects the two cylindrical portions. However, other solutions are also possible here.

In the enlargement of FIG. 3, the second diameter D2 is shown as the diameter of the cylindrical portion of the second portion 14G. However, this is not mandatory. The second diameter D2 could also be a diameter at a point of the conical portion or the conical tapering 14H. Also at the tapering 14H, the diameter D2 of the second portion 14G is smaller than the diameter D1 of the first portion 14F. Correspondingly, the ventilation gap 18 is already formed when the first portion 14F steps out of the guide 17.

Alternatively to the illustrative embodiment, in which the second portion 14G is partially conical, the first portion 14F and the second portion 14G could both be cylindrical, wherein the diameter D1 of the first portion 14F is larger than the diameter D2 of the second portion 14B and an in particular radial shoulder is formed between the first portion 14F and the second portion 14G, in particular instead of the tapering 14H.

Alternatively or additionally, it would be possible for the second portion 14G to have substantially the same diameter as the first portion 14F and for the piston 14 in the second portion 14G to have a recess or a channel or the like on its outer circumference such that the second portion 14G is thereby spaced apart from the guide 17 and, upon exceeding the specific stroke H, the ventilation gap 18 is formed between the recess or the channel and the guide 17.

The guide 17 preferably has a sealing lip 17A. The sealing lip 17A is preferably circumferential. In particular, the sealing lip 17A consists of the same material as the guide 17 and/or the sealing lip 17A is formed in one piece with the guide 17. The sealing lip 17A preferably forms an elevation of the guide 17 and/or projects from the guide 17, in particular radially and/or inward.

In the initial position and/or before exceeding the specific stroke H, the sealing lip 17A preferably bears radially sealingly against the piston 14, in particular the first portion 14F.

The described improved sealing is achieved in particular in that, as described, radial sealing is provided between the piston 14 and the guide 17. In contrast to this, axial sealing is often used in the prior art, for example in WO 2019/175349 A1 already mentioned at the outset. Upon such axial sealing, any movement of the piston out of the initial position already leads to the formation of a ventilation gap, in contrast to the radial sealing proposed here.

The described radial sealing is advantageous in particular when a spring bellows is used as the return device 16. The spring bellows offers the advantage, in particular, that it is arranged externally around the pump 6 or the piston 14 and thus does not come into contact with the product 2. As a result, in particular chemical reactions and/or swelling can be avoided. On the other hand, however, it has been observed with such spring bellows that with increasing age and/or after a multiplicity of actuations or stroke movements, there is the risk that they "wear out" and/or are no longer able to pretension or return the piston 14 completely into the initial position. As a result of the radial sealing described above, it is achieved that even in this case, when the piston 14 is no longer completely moved back into the initial position by the return device 16 or the spring bellows after actuation, the sealing between the piston 14 and the guide 17 is ensured or no product 2 can emerge from the container 3. In particular as a result of a combination of the design of the return device 16 as a spring bellows with the described radial sealing between the piston 14 and the guide 17, the advantages of the spring bellows can be achieved without accepting the disadvantages thereof. Thus, the combination of the spring bellows with the radial sealing constitutes a particularly advantageous synergistic combination.

Preferably, the pump 6 and/or the pump housing 8 has a ventilation channel 22. The ventilation channel 22 preferably extends from the pump chamber 15 to an outer side of the pump housing 8. By means of the ventilation channel 22, in particular air which passes through the ventilation gap 18 into the pump 6 or the pump chamber 15 can escape again from the pump 6 or the pump chamber 15 and/or pass into the container 3.

In the illustrative embodiment, the ventilation channel 22 is formed between the housing lid 9 and the lower part 8A.

Preferably, the ventilation channel 22 has a plurality of different portions. In particular, the ventilation channel has a first or radial portion 22A, a second or circumferentially extending and/or circular-line-shaped portion 22B and/or a third or axial or axially extending portion 22C, in particular parallel to the longitudinal axis A. However, other solutions are also possible here.

In the illustrative embodiment, the first or radial portion 22A is formed by a preferably rectilinear and/or radially, in particular realtive to the axis A, extending recess, or a channel extending radially, in particular relative to the axis A, in the housing lid 9 or the inner wall thereof. Furthermore, in the illustrative embodiment, the second or circumferentially extending and/or circular-line-shaped portion 22B is formed by a recess or a channel in the housing lid 9 or the inner wall thereof. In the illustrative embodiment, the third or axial portion 22C is formed by a recess or a channel in the housing lid 9 or the inner wall thereof and/or an upper end of the lower part 8A or the outer edge thereof.

The first or radial portion 22A and the third or axial portion 22C are preferably arranged offset with respect to one another, in particular so that the first or radial portion 22A is connected to the third or axial portion 22C by the second or circular-line-shaped portion 22B and/or does not merge directly into the third or axial portion 22C. Preferably, the first or radial portion 22A and the third or axial portion 22C are arranged radially opposite one another and/or by at least substantially 180° with respect to one another. However, other solutions are also possible here, for example an offset arrangement of the first or radial portion 22A and the third or axial portion 22C by less than 180°.

On the one hand, ventilation of the container 3 is made possible by the ventilation channel 22, but on the other hand, in particular by the various portions, it is prevented that product 2 can escape from the container 3 through the ventilation channel 22.

FIG. 3 schematically shows the path W via which air can pass through the ventilation gap 18 and preferably the ventilation channel 22 into the container 3.

The outlet valve 13 preferably has a valve spring 13A, a valve seat 13B and a valve body or shaft 13C. Preferably, the valve body or shaft 13C is pretensioned by means of the valve spring 13A against the valve seat 13B, in particular in such a way that the valve seat 13B is in a closed position and/or the outlet valve 13 is closed.

Preferably, the piston 14 has the valve seat 13B of the outlet valve 13 and/or the valve seat 13B is formed by the piston 14 or a portion of the piston 14. Particularly preferably, the piston 14 has on its inner side a projection or a shoulder which forms the valve seat 13B.

In FIGS. 2 and 3, the outlet valve 13 is shown closed in each case.

The valve spring 13A and the shaft 13C are preferably formed in one piece and/or are formed by different portions of a one-piece component 19.

The component 19 or the valve spring 13A and/or the shaft 13C preferably consist of the same material and/or of plastic, in particular polyethylene (PE) and/or polypropylene (PP). Preferably, the component 19 is an injection-molded part.

The valve spring 13A preferably has a plurality of webs 13D, preferably extending at least substantially in the circumferential direction, and/or a plurality of supports 13E, preferably extending at least substantially axially, or is formed thereby. The webs 13D and supports 13E preferably lie at least substantially on a cylinder lateral surface.

In particular, free spaces 13F are formed between the webs 13D and supports 13E. Preferably, the free spaces 13F enable a compression of the valve spring 13A, in particular in combination with the plastic and/or elastic material of which the valve spring 13A or the webs 13D and supports 13E consist.

The webs 13D are preferably annular and/or circular. Preferably, the webs 13D are connected to one another by the supports 13E. The webs 13D and the supports 13E preferably form a framework/skeleton.

In particular, a spring is formed by the webs 13D and the supports 13E, so that the valve spring 13A and/or the webs 13D and the supports 13E can be compressed and a spring force is generated by the compression, by which the valve spring 13A is automatically released and/or returns to the position assumed before the compression.

Preferably, two adjacent webs 13D are connected to one another by at least two, preferably exactly two, supports 13E, in particular wherein the two supports 13E lie radially opposite one another.

Preferably, one or more supports 13E are arranged on each side of a web 13D, in particular an upper side and a lower side. The upper side and the lower side are in particular axially opposite sides of a web 13D. The supports 13E arranged on different sides of a web 13D are preferably offset with respect to one another, in particular by 90°.

Figure 5:
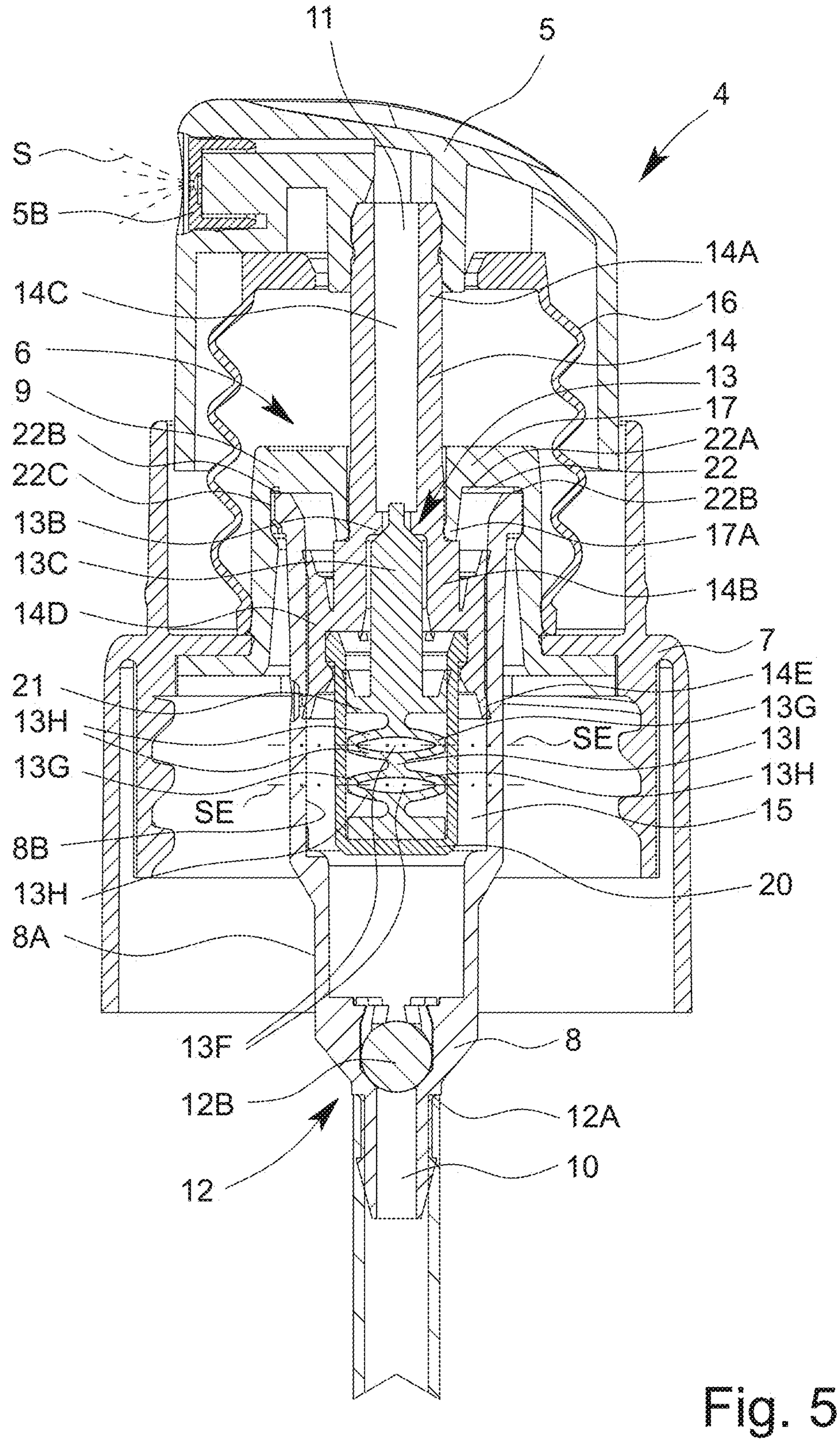
FIG. 5 shows a sectional representation according to FIG. 2, wherein the pump has a valve spring in an alternative embodiment.

An alternative embodiment of the valve spring 13A is shown in FIG. 5.

Also in the embodiment of the valve spring 13A from FIG. 5, the valve spring 13A and the shaft 13C are preferably formed in one piece and/or are formed by different portions of a one-piece component 19.

Likewise, in the embodiment of the valve spring 13A from FIG. 5, the component 19 or the valve spring 13A and/or the shaft 13C preferably consist of the same material and/or of plastic, in particular polyethylene (PE) and/or polypropylene (PP). Preferably, the component 19 is an injection-molded part.

Unless specific properties are explicitly concerned which only apply to one of the two embodiments of the valve spring 13A shown in the figures, the explanations above and below apply explicitly to both embodiments of the valve spring 13A. Firstly, however, the embodiment in FIG. 5 is explicitly described in more detail below.

The embodiment of the valve spring 13A shown in FIG. 5 differs from the embodiment of the valve spring 13A from FIGS. 1 to 4 in particular by a different design of the spring elements which are formed in the embodiment of the valve spring 13A from FIGS. 1 to 4 by the webs 13D and supports 13E.

In the embodiment shown in FIG. 5, the valve spring 13A preferably has a leaf-spring-like or cup-spring-like construction.

Preferably, the valve spring 13A has at least one, preferably at least two or more, spring elements 13G. The spring elements 13G are preferably arranged axially one behind the other, in particular in the direction of the longitudinal axis A. The longitudinal axis A constitutes in particular a longitudinal axis of the valve spring 13A and is referred to below predominantly shortened as axis A.

The spring elements 13G are preferably formed in the same way, in particular identically.

A spring element 13G preferably has in each case two similar portions 13H, which are in particular identical and/or mirror-symmetrically with respect to one another, or is formed thereby. The portions 13H preferably extend substantially transversely to the axis A, in particular of the valve spring 13A. Preferably, the portions 13H are formed in a planar manner.

The spring elements 13G and/or portions 13H preferably each consist of plastic, in particular polyethylene (PE) and/or polypropylene (PP), and/or an elastic material.

Preferably, the portions 13H of a spring element 13G are each designed and/or arranged mirror-symmetrically with respect to a mirror plane SE, preferably wherein the mirror plane SE runs transversely, in particular perpendicularly, to the axis A. This is shown in particular in FIG. 5.

The portions 13H are preferably bent or curved. In the cross-section, as shown in particular in FIG. 5, the portions 13H preferably each form an arc which is curved away from a (hypothetical) plane which is arranged horizontally with respect to the axis A.

The two portions 13H of a spring element 13G are preferably each bent or curved in opposite directions, in particular simply curved and/or curved in the manner of a circular arc, as shown in particular in FIG. 5. Preferably, the portions 13H each have a simply curved surface and/or the portions 13H each constitute a simply curved part. In particular, the two portions 13H of a spring element 13G are each curved away from the respective mirror plane SE, so that the distance between two portions 13H of a spring element 13G decreases with increasing distance from the axis A.

Preferably, the two portions 13H of a spring element 13G are connected to one another in a direction transversely, in particular perpendicularly, to the axis A at their ends spaced apart from the axis A. The spring elements 13G are preferably annular.

The spring elements 13G are preferably compressible. By the curvature of the portions 13H in combination with the connected ends, in particular spring elements 13G are formed which each have a free space 13F between the portions 13H, which free space extends substantially transversely to the axis A. The free space 13F is in particular mirror-symmetrically with respect to the respective mirror plane SE of the spring element 13G. Preferably, the free space 13F or distance between two portions 13H of a spring element 13G is greatest at the axis A and decreases with increasing distance from the axis A, until the portions 13H meet at the ends.

Preferably, the free spaces 13F enable a compression of the valve spring 13A, in particular in combination with the plastic and/or elastic material of which the valve spring 13A or the spring elements 13G or their portions 13H consist. Upon compression, preferably the portions 13H of a spring element 13G are moved towards one another and/or the free space 13F of the spring element 13G is reduced.

Preferably, two adjacent spring elements 13G are connected to one another in each case by a connecting piece 13I. The connecting piece 13I or the connecting pieces 13I preferably consist/consists of the same material as the spring elements 13G and/or is/are preferably formed in one piece with the spring elements 13G.

The connecting pieces 13I are preferably arranged centrally and/or in the region of the axis A.

Preferably, the connecting pieces 13I are elongated and/or linear and/or the connecting pieces run transversely, in particular perpendicularly, to the axis A.

The portions 13H preferably each have an at least substantially constant thickness. The thickness of a portion 13H is preferably at least 0.2 mm or more, preferably 0.4 mm or more, and/or at most 0.8 mm or less, preferably 0.6 mm or less, in particular approximately 0.5 mm.

The maximum distance between two portions 13H of a spring element 13G and/or the height of the free space 13F of a portion, in particular in the centre or along the axis A and/or perpendicularly to the mirror plane SE, is preferably at least 0.75 mm or more, preferably 0.85 mm or more, and/or at most 1.15 mm or less, preferably 1.05 mm or less, in particular approximately 0.95 mm.

The width of a free space 13F, in particular therefore the extent of a free space perpendicularly to the axis A or parallel to and/or in the mirror plane SE, is preferably at least 3.0 mm or more, preferably 3.5 mm or more, and/or at most 5.0 mm or less, preferably 4.5 mm or less, in particular approximately 3.9 mm.

The width of a connecting piece 13I is preferably at least 0.6 mm or more, preferably 0.7 mm or more, and/or at most 1.0 mm or less, preferably 0.9 mm or less, in particular approximately 0.8 mm.

Figure 6:
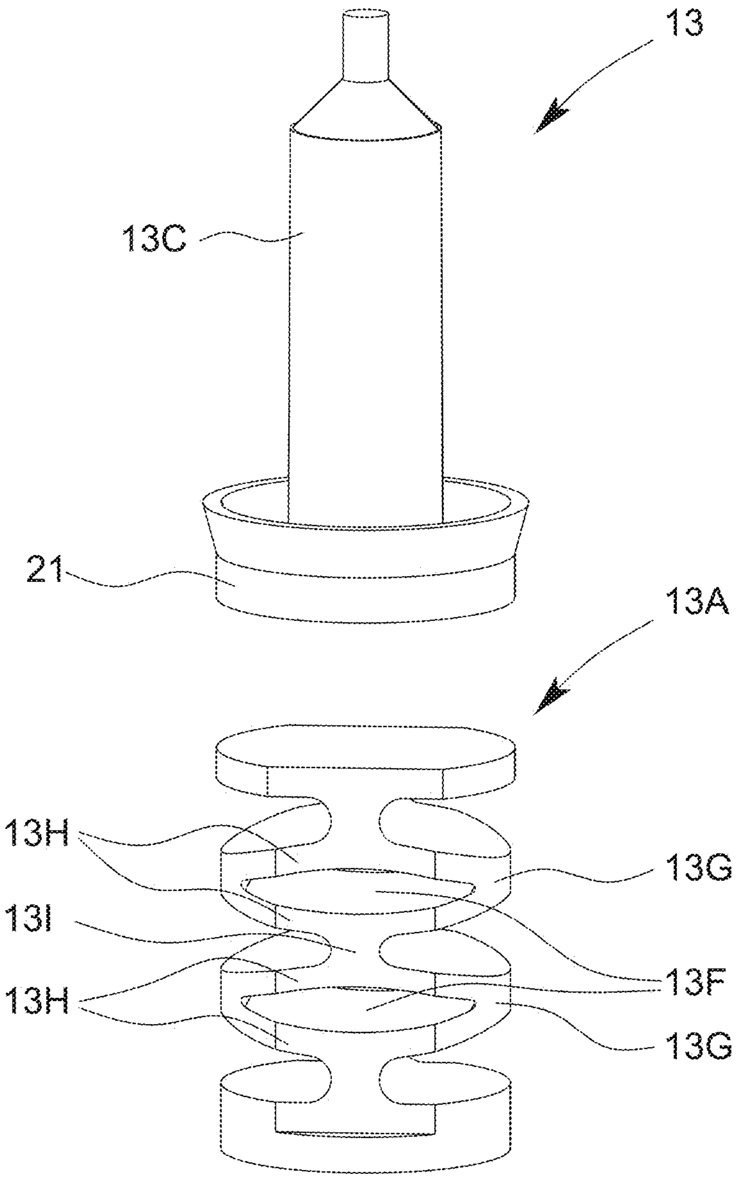
FIG. 6 shows a perspective representation of valve spring and valve stem according to a further embodiment.

It is also possible that the valve spring 13A and the shaft 13C are formed separately from one another or are formed by two separate components. This is shown in a perspective representation in FIG. 6. FIG. 6 shows the valve spring 13A according to the second embodiment from FIG. 5. In principle, it is also possible that the valve spring 13A and the shaft 13C are formed separately from one another or are formed by two separate components, wherein the valve spring 13A is formed according to the first embodiment from FIGS. 1 to 4.

In particular, the valve spring 13A according to the embodiment shown in FIG. 5 or 6 forms a separate aspect, which can also be realized independently.

The component 19 or the valve spring 13A and the shaft 13C are preferably arranged in a housing 20. The housing 20 is preferably arranged within the pump housing 8 and/or is movable within the pump housing 8 and/or the pump chamber 15, in particular axially or along the axis A.

The housing 20 is preferably arranged or fastened on the piston 14, in particular such that it moves together with the piston 14 upon a movement of the piston 14. The housing 20 is preferably fastened on the piston 14 and/or latched on the piston 14 by means of a latching connection.

The housing 20 is preferably sleeve-like and/or the housing 20 forms a chamber for the valve spring 13A.

The housing 20 is preferably elongated and/or at least substantially cylindrical. The inner diameter of the housing 20 particularly preferably corresponds at least substantially to the outer diameter of the valve spring 13A and/or of the component 19.

The housing 20 is preferably filled with a compressible medium, in particular gas, particularly preferably air.

The housing is preferably arranged centrally in the pump housing 8 and/or coaxially with the pump housing 8 and/or the piston 14.

The pump chamber 15 preferably extends-particularly preferably annularly-around the housing 20, in particular in such a way that the product 2 can flow around the housing 20.

In particular, the pump chamber 15 is delimited laterally or radially by the housing 20 and the pump housing 8 and/or the housing 20 forms an inner wall and the pump housing 8 forms an outer wall of the pump chamber 15.

The component 19 preferably has a separating section 21. The separating section 21 is preferably arranged between the valve spring 13A and the shaft 13C. The separating section 21 preferably bears sealingly against the housing 20 or an inner wall of the housing 20. In particular, a sealed spring chamber, within which the valve spring 13A is arranged, is formed by the separating section 21 and the housing 20.

The separating section 21 forms in particular a seal for sealingly bearing against the housing 20 or has such a seal.

In the illustrative embodiment, the separating section 21 forms or has a sealing lip. However, other embodiments are also possible, for example wherein the separating section has or forms two or more sealing lips.

The valve spring 13A is preferably separated from the product 2 by the separating section 21. In other words, in this way the product 2 cannot come into contact with the valve spring 13A, as a result of which corresponding advantages are achieved. In particular, chemical reactions and/or swelling can be avoided as a result.

Preferably, the separating section 21 and/or the shaft 13C are movable relative to the housing 20 and/or the valve spring 13A is compressible.

The pump 6 preferably has a pre-compression mechanism. Such a pre-compression mechanism is explained, for example, in WO 95/08400 A1. Particularly preferably, the pre-compression mechanism is formed by the piston 14, the shaft 13C, the valve spring 13A and the housing 20.

The individual components of the pump 6, in particular the pre-compression mechanism or the piston 14, the shaft 13C, the valve spring 13A, the housing 20 and the pump 15 are preferably matched to one another such that the outlet valve 13 only opens when the product 2 is under such a high pressure that spraying dispensing and dispensing of the product 2 without dripping by means of the dispensing head 5 is made possible. Preferably, the mentioned parts are designed such that the outlet valve 13 closes as soon as the pressure in the pump chamber 15 is too low.

By the pre-compression mechanism, in particular too low a pressure of the product 2 to be dispensed can be avoided. This leads to the fact that dripping of the dispensing head 5 and/or of the dispensing unit 4 is preferably avoided by the pre-compression mechanism and/or particularly fine atomization during dispensing of the product 2 as an aerosol or spray S is made possible.

According to a preferred aspect, which can also be realized independently, all parts or components of the pump 6, the dispensing unit 4 and/or the dispensing device 1 consist of the same basic material or of materials of the same material class, in particular plastic, particularly preferably polyethylene (PE) and/or polypropylene (PP). In particular, the container 3, the dispensing unit 4, the dispensing head 5, the nozzle 5B, the pump 6, the connecting part 7, the pump housing 8, the housing lid 9, the valve body 12B, the piston 14, the return device 16, the component 19 and/or the housing 20 can consist of the same basic material or of materials of the same material class, in particular plastic, particularly preferably polyethylene (PE) and/or polypropylene (PP). As a result, optimized and/or complete recycling is made possible.

Even if different parts consist of the same basic material, they can differ in their properties, for example hardness, density, elasticity, color, strength, stiffness, resistance or the like. For example, different variants with different properties, inter alia low-density polyethylene (LDPE) and high-density polyethylene (HDPE), exist from the basic material polyethylene. Thus, it is possible to manufacture different parts with different requirements from the same basic material.

Below, the movement sequence of the dispensing device 1 or of the pump 6 will be explained in more detail.

FIGS. 1 and 2 show the dispensing device 1 or the pump 6 in the non-actuated state or in an initial position. FIG. 3 shows the pump 6 in an end position in which the piston 14 is moved completely downward or in the direction of the inlet 10.

The initial or rest position of the dispensing device 1 or of the pump 6 is preferably the position which the pump 6, in particular the piston 14, assumes in the non-actuated state and/or automatically or by the return force of the return device 16. In the initial position, the volume of the pump chamber 15 is at a maximum and/or the return device 16 presses the piston 14 upward or against the pump housing 8 or the housing lid 9.

Preferably, the initial position or a movement of the piston 14 beyond the initial position is (axially or upward) delimited by the stop of the piston 14, in particular of the piston head 14B, against the pump housing 8 or the housing lid 9.

The end position is preferably the position which the pump 6, in particular the piston 14, assumes with complete actuation of the pump 6. In particular, the piston 14 is moved or pressed completely downward or in the direction of the inlet 10 in the end position. In the end position, the volume of the pump chamber 15 is mini-mal and/or smaller than in the initial position.

Preferably, the end position or a movement of the piston 14 beyond the end position is (axially or downward) delimited by a stop of the piston 14, in particular of the piston head 14B, against the pump housing 8.

Preferably, the pump 6 can be transferred from the initial position, as shown in FIGS. 1 and 2, into the end position, as shown in FIG. 3, by (manual) actuation or depression of the dispensing head 5.

Preferably, the return device 16 is designed to transfer the pump 6, in particular by means of spring force or automatically, from the end position into the initial position. In particular, an automatic return of the pump 6 and/or of the piston 14 into the initial position takes place by the return device 16 after actuation of the pump 6.

The piston 14 is preferably pretensioned in the initial position by means of the return device 16. In particular, the return device 16 presses the piston 14 and/or the piston head 14B against the pump housing 8 or the housing lid 9.

By actuation of the dispensing device 1 or of the dispensing head 5, the piston 14 is movable against the spring force of the return device 16 and/or downward in the customary position of use and/or in the direction of the container 3, preferably as a result of which the volume of the pump chamber 15 is reduced and/or the pressure in the pump chamber 15 is increased.

By the size reduction of the volume of the pump chamber 15 and/or by the pressure increase in the pump chamber 15, the inlet valve 12 is (automatically) closed and/or the valve body 12B is pressed against the valve seat 12A, in particular in such a way that the product 2 in the pump chamber 15 cannot flow back into the container 3.

The outlet valve 13 is designed to open automatically when a predetermined pressure in the pump chamber 15 is exceeded. In particular, a pressure increase in the pump chamber 15 and/or actuation of the dispensing device 1 or of the dispensing head 4 or of the pump 6 leads to the shaft 13C moving against the spring force of the valve spring 13A relative to the valve seat 13B or to the piston 14 and/or lifting up from the valve seat 13B or piston 14, preferably in such a way that the outlet valve 13 opens and/or the product 2 can flow out of the pump chamber 15 through the outlet valve 13 into the outlet channel 14C of the piston 14.

The opening of the outlet valve 13 brings about a pressure drop in the pump chamber 15, preferably in such a way that the outlet valve 13 would close again without further actuation of the dispensing device 1 or of the dispensing head 5. However, by a continuous actuation of the dispensing device 1 or of the dispensing head 5 or of the pump 6, the volume of the pump chamber 15 is further reduced and/or the product 2 in the pump chamber 15 is pressurized, preferably in such a way that the outlet valve 13 remains open until the end position, as shown in FIG. 3, is reached.

After or when the end position is reached, the dispensing process is concluded and/or the outlet valve 13 closes, in particular in that the pressure in the pump chamber is now reduced by the dispensing of the product 2 and the shaft 13C is pressed again against the valve seat 13B by the valve spring 13A.

After the dispensing of the product 2 or by releasing the dispensing head 5, automatic filling of the pump chamber 15 preferably takes place.

As soon as the dispensing head 5 is released, the return device 16 presses the piston 14 or the piston head 14B upward again or in the direction of the dispensing head 5 or into the initial position.

By the return of the pump 6, in particular of the piston 14, from the end position into the initial position, the volume of the pump chamber 15 is increased and/or the pressure is reduced by the volume increase of the pump chamber 15, preferably as a result of which the inlet valve 12 opens and/or the valve body 12B is lifted from the valve seat 12A.

By the movement of the piston 14 from the end position into the initial position and/or upward in the customary position of use of the dispensing device 1, a predefined volume of the product 2 is sucked or conveyed from the container 3 via the inlet 10 and/or the inlet valve 12 into the pump chamber 15.

During the return of the piston 14, the product 2 flows into the initial position through the inlet valve 12 laterally past the housing 20 into the pump chamber 15.

As soon as the initial position is reached, the filling of the pump chamber 15 is concluded. By renewed actuation of the dispensing device 1 or of the dispensing head 5, the product 2 located in the pump chamber 15 can then be dispensed, as already explained.

In particular, the present disclosure relates to the following aspects, which can be realized independently, but also in combination with the aspects, properties and features explained above:

1. Pump 6 for a preferably liquid product 2,
   wherein the pump 6 has a pump housing 8, a piston 14, a pump chamber 15, an inlet 10, an outlet 11, an inlet valve 12 and an outlet valve 13,
   wherein the piston 14 is axially movable in order to convey the product 2 via the inlet 10 into the pump chamber 15 and out of the pump chamber 15 to the outlet 11,
   characterized in
   that the piston 14 is guided in a guide 17 and has a first portion 14F and a second portion 14G, wherein, in an initial position of the piston 14, the first portion 14F bears radially sealingly against the guide 17 and the second portion 14G is at least partially spaced apart from the guide 17, and that, upon movement of the piston 14 out of the initial position up to a specific stroke H, the radial sealing of the piston 14 with respect to the guide 17 is maintained and, upon exceeding the specific stroke H, a ventilation gap 18 is formed between the piston 14, in particular the second portion 14G, and the guide 17, and/or
   that the outlet valve 13 has a valve spring 13A, a valve seat 13B and a shaft 13C, that the shaft 13C is pretensioned by means of the valve spring 13A against the valve seat 13B into a closed position, and that the valve spring 13A and the shaft 13C are formed by different portions of a one-piece component 19.
2. Pump according to aspect 1, characterized in that the specific stroke H is at least 2 mm or more, preferably at least 3 mm or more, and/or at most 6 mm or less, preferably at most 5 mm or less, particularly preferably at most 4 mm or less.
3. Pump according to aspect 1 or 2, characterized in that the second portion 14G is at least partially conical and/or that the first portion 14F has a first diameter D1 and the second portion 14G has a second diameter D2 which is smaller than the first diameter D1.
4. Pump according to one of the preceding aspects, characterized in that the guide 17 has a circumferential sealing lip 17A which, in the initial position, bears radially sealingly against the piston 14, in particular the first portion 14F.
5. Pump according to one of the preceding aspects, characterized in that the component 19 consists of plastic and/or is an injection-molded part and/or that all parts of the pump 6 consist of the same basic material, in particular plastic, particularly preferably polyethylene and/or polypropylene.
6. Pump according to one of the preceding aspects, characterized in that the component 19 or the valve spring 13A and the shaft 13C are arranged at least partially in a housing 20, preferably wherein the housing 20 is arranged or fastened on the piston 14 and/or is arranged and/or movable within the pump chamber 15 and/or the pump housing 8.
7. Pump according to one of the preceding aspects, characterized in that the valve spring 13A is separated from the product 2, in particular by the housing 20 and/or a separating section 21 of the component 19, preferably wherein a sealed spring chamber for the valve spring 13A, in which the valve spring 13A is arranged, is formed by the housing 20 and the separating section 21.
8. Pump according to one of the preceding aspects, characterized in that the pump 6 has a pre-compression mechanism and/or a pre-compression mechanism is formed by the piston 14, the shaft 13C, the valve spring 13A and the housing 20.
9. Pump according to one of the preceding aspects, characterized in that the inlet valve 12 and/or the outlet valve 13 is/are designed as a self-opening valve and/or that the piston 14 has or forms the valve seat 13B of the outlet valve 13.
10. Pump according to one of the preceding aspects, characterized in that the piston 14, the pump chamber 15, the valve spring 13A, the inlet valve 12 and/or the outlet valve 13 is/are arranged at least partially in the pump housing 8.
11. Dispensing unit 4 for dispensing a preferably liquid product 2, wherein the dispensing unit 4 has a pump 6 according to one of the preceding aspects and a dispensing head 5 connected to the piston 14 of the pump 6, via which a product 2 conveyed by the pump 6 can be dispensed.
12. Dispensing unit according to aspect 11, characterized in that the dispensing unit 4 has a return device 16, in particular a return spring, for pretensioning and/or returning the piston 14 and/or the dispensing head 5 into the initial position.
13. Dispensing unit according to aspect 12, characterized in that the return device 16 is designed as a spring bellows and/or consists of plastic.
14. Dispensing unit according to aspect 12 or 13, characterized in that the return device 16 is arranged between the dispensing head 5 and the pump 6 and/or at least partially surrounds the pump 6 and/or the piston 14 and/or is arranged outside the pump 6 and/or the pump chamber 15.
15. Dispensing device 1 for dispensing a preferably liquid product 2, wherein the dispensing device 1 has a dispensing unit 4 according to one of aspects 11 to 14 and a container 3 with or for the product 2, and wherein the dispensing head 5 is fluidically connected to the container 3 via the pump 6, so that the product 2 can be conveyed from the container 3 with the pump 6 and can be dispensed via the dispensing head 5.

Individual aspects and features of the present invention can be realized independently of one another, but also in any combination and/or sequence.

LIST OF REFERENCE SIGNS

| | | | |
|---|---|---|---|
| 1 | Dispensing device | 13I | Connecting piece |
| 2 | Product | 14 | Piston |
| 3 | Container | 14A | Piston shank |
| 4 | Dispensing unit | 14B | Piston head |
| 5 | Dispensing head | 14C | Outlet channel |
| 5B | Nozzle | 14D | Guide surface |
| 6 | Pump | 14E | Seal |
| 7 | Connecting part | 14F | First Portion |
| 8 | Pump housing | 14G | Second Portion |
| 8A | Lower part | 14H | Tapering |
| 8B | Inner surface | 15 | Pump Chamber |
| 9 | Housing lid | 16 | Return Device |
| 10 | Inlet | 17 | Guide |
| 11 | Outlet | 17A | Sealing lip |
| 12 | Inlet valve | 18 | Ventilation gap |
| 12A | Valve seat | 19 | Component |
| 12B | Valve body | 20 | Housing |
| 13 | Outlet valve | 21 | Separating section |
| 13A | Valve spring | 22 | Ventilation channel |
| 13B | Valve seat | 22A | First portion |
| 13C | Shaft | 22B | Second portion |
| 13D | Web | 22C | Third portion |
| 13E | Support | | |
| 13F | Free space | D1 | First diameter |
| 13G | Spring element | D2 | Second diameter |
| 13H | Portion | S | Spray |
| SE | Mirror plane | | |
| H | Specific stroke | | |
| W | Path | | |

The invention claimed is:

1. A pump for a product wherein the pump comprises:

a pump housing, a piston, a pump chamber, an inlet, an outlet, an inlet valve and an outlet valve, wherein the piston is axially movable and configured to convey the product via the inlet into the pump chamber and out of the pump chamber to the outlet, wherein the outlet valve has a valve spring made of plastic configured to pretension a valve stem against a valve seat of a dispensing unit which is configured to dispense the product, wherein the valve spring comprises a plurality of spring elements arranged axially one behind the other, wherein each spring element of the plurality of spring elements has two curved portions which are formed mirror-symmetrically with respect to one another and are connected to one another at their ends, wherein said two curved portions of a spring element are arranged mirror-symmetrically with respect to a mirror plane that runs transversely or perpendicularly to the axis, wherein said two curved portions of a spring element are each curved away from the respective mirror plane, so that a distance between the two portions of a spring element decreases with increasing distance from the axis, and wherein two adjacent spring elements are each connected to one another by a connecting piece.

2. The valve spring according to claim 1, wherein one or more of the plurality of spring elements and the portions are formed in the same way.

3. The valve spring according to claim 1, wherein the portions extend substantially transversely to the axis and/or are planar.

4. The valve spring according to claim 1, wherein the portions each have one or more of: at least a substantially constant thickness, a thickness of a portion is at least 0.2 mm, and the thickness of a portion at most 0.8 mm.

5. The valve spring according to claim 1, wherein the plurality of spring elements and/or portions each comprise one or more of polyethylene and polypropylene.

6. The valve spring according to claim 1, wherein the maximum distance between two portions of a spring element is at least 0.75 mm and at most 1.15 mm.

7. The valve spring according to claim 1, wherein the plurality of spring elements are compressible.

8. The valve spring according to claim 1, wherein plurality of spring elements are formed by a curvature of the portions in combination with connected ends, which plurality of spring elements each have a free space between the portions, which free space extends substantially transversely to the axis.

9. The valve spring according to claim 8, wherein the width of the free space and an extent of a free space perpendicular to the axis, is at least 3.0 mm and at most 5.0 mm.

10. The valve spring according to claim 1, wherein the connecting piece comprises a same material as the plurality of spring elements and are formed in one piece with the spring elements.

11. The valve spring according to claim 1, wherein the connecting piece is arranged centrally and/or in the region of the axis.

12. The pump according to claim 1, wherein the outlet valve has the valve spring, a valve seat and a shaft, wherein the shaft is pretensioned by the valve spring against the valve seat into a closed position, and wherein the valve spring and the shaft are formed by different portions of a one-piece component.

13. The pump according to claim 1, wherein the basic material is one or more of: plastic, polyethylene and polypropylene.

14. The pump according to claim 1, wherein the component or the valve spring and the shaft are arranged at least partially in a housing.

15. The pump according to claim 14, wherein the housing is arranged or fastened on the piston and/or is arranged and/or movable within the pump chamber and/or the pump housing.

16. A dispensing device for dispensing a product, wherein the dispensing device has a dispensing unit, the dispensing unit having a pump according to claim 1 and a dispensing head, and a container with or for the product, and wherein the dispensing head is fluidically connected to the container via the pump, so that the product can be conveyed from the container with the pump and can be dispensed via the dispensing head.

* * * * *